US012794028B2

(12) United States Patent
Emery et al.

(10) Patent No.: US 12,794,028 B2
(45) Date of Patent: Nov. 10, 2026

(54) ELECTRICAL ENERGY STORAGE MODULE FOR A VEHICLE

(71) Applicant: RENAULT S.A.S, Boulogne Billancourt (FR)

(72) Inventors: Nicolas Emery, Montigny-le-bretonneux (FR); Jean-Pierre Pereira-Ramos, Marolles en Brie (FR); Xavier Petrissans, Guyancourt (FR); Yanlong Zhou, Guyancourt (FR)

(73) Assignee: AMPERE S.A.S., Boulogne Billancourt (FR)

( * ) Notice: Subject to any disclaimer, the term of this patent is extended or adjusted under 35 U.S.C. 154(b) by 565 days.

(21) Appl. No.: 18/257,632

(22) PCT Filed: Dec. 6, 2021

(86) PCT No.: PCT/EP2021/084444
§ 371 (c)(1),
(2) Date: Jun. 15, 2023

(87) PCT Pub. No.: WO2022/128582
PCT Pub. Date: Jun. 23, 2022

(65) Prior Publication Data

US 2024/0120564 A1 Apr. 11, 2024

(30) Foreign Application Priority Data

Dec. 16, 2020 (FR) ..................................... 20 13384

(51) Int. Cl.
*H01M 10/48* (2006.01)
*B60R 16/033* (2006.01)
(Continued)

(52) U.S. Cl.
CPC ......... *H01M 10/482* (2013.01); *B60R 16/033* (2013.01); *H01M 4/58* (2013.01);
(Continued)

(58) Field of Classification Search
CPC ............. H01M 10/482; H01M 50/249; H01M 50/258; H01M 50/204; H01M 4/58; H01M 2004/027; H01M 2220/20; B60R 16/033
See application file for complete search history.

(56) References Cited

U.S. PATENT DOCUMENTS 10,670,649 B2 * 6/2020 Michallick ......... G01R 31/2853
2010/0233546 A1 * 9/2010 Nesper .................. H01M 4/621
977/773
(Continued)

FOREIGN PATENT DOCUMENTS

CN 101916859 A 12/2010
EP 3447879 A1 * 2/2019 .............. H02J 7/977
JP 7-130366 A 5/1995

OTHER PUBLICATIONS

The decision of JPO to grant a Patent for Application JP 2023535713 (Year: 2025).*
(Continued)

*Primary Examiner* — Alexander Usyatinsky
(74) *Attorney, Agent, or Firm* — Oblon, McClelland, Maier & Neustadt, L.L.P.

(57) ABSTRACT

An electrical energy storage module for a vehicle includes at least one electrical energy storage battery that has at least one negative electrode at least partially composed of lithium-metal nitride. The electrical energy storage module also includes at least one ammonia sensor for detecting a
(Continued)

release of ammonia due to the decomposition of the lithium-metal nitride of the negative electrode in the presence of air or humidity.

11 Claims, 2 Drawing Sheets

(51) Int. Cl.

| | |
|---|---|
| ***H01M 4/58*** | (2010.01) |
| ***H01M 50/204*** | (2021.01) |
| ***H01M 50/249*** | (2021.01) |
| ***H01M 50/258*** | (2021.01) |
| *H01M 4/02* | (2006.01) |

(52) U.S. Cl.
CPC ....... *H01M 50/204* (2021.01); *H01M 50/249* (2021.01); *H01M 50/258* (2021.01); *H01M 2004/027* (2013.01); *H01M 2220/20* (2013.01)

(56) References Cited

U.S. PATENT DOCUMENTS

| | | | | |
|---|---|---|---|---|
| 2014/0072843 | A1 | 3/2014 | Liemersdorf et al. | |
| 2016/0276664 | A1 * | 9/2016 | Gunji | H01M 4/505 |
| 2016/0351893 | A1 * | 12/2016 | Wietelmann | H01M 4/623 |
| 2019/0081370 | A1 | 3/2019 | Capati et al. | |
| 2019/0145833 | A1 * | 5/2019 | Ryu | G01K 1/02 340/870.17 |

OTHER PUBLICATIONS

The decision of EPO to grant a European Patent for Application EP 21823579 (Year: 2025).*
International Search Report issued Mar. 18, 2022 in PCT/EP2021/084444 filed on Dec. 6, 2021, 2 pages.
French Preliminary Search Report Issued Aug. 12, 2021, in French Application 20 13384 filed on Dec. 16, 2020 (with English Translation of Categories of Cited Documents), 3 pages.
English Translation of Office Action issued in Chinese Patent Application No. 202180084199.9.

* cited by examiner

ELECTRICAL ENERGY STORAGE MODULE FOR A VEHICLE

BACKGROUND

The present invention relates to the field of electrical batteries for storing electrical energy. More precisely, the invention relates to a module for storing electrical energy for a vehicle and in particular for a motor vehicle.

Electrical batteries based on lithium-ion electrochemical accumulators, which are commonly called “lithium-ion cells”, are increasingly used as stand-alone power sources, in particular in applications related to electrical mobility. This tendency is in particular explicable by energy densities per unit mass and per unit volume that are clearly higher than those of conventional nickel-cadmium (Ni—Cd) and nickel-metal-hydride (Ni-MEI) accumulators, an absence of memory effect, a low self-discharge with respect to other accumulators and also a low cost per kilowatt hour An electrical battery comprises, generally, a plurality of energy-storing modules, which are placed side-by-side and electrically connected. Each energy-storing module comprises a plurality of electrical-energy accumulators. These accumulators are placed side-by-side in a casing that participates in delineating the energy-storing module and these accumulators are electrically connected to one another. Such a configuration allows the battery to store a large amount of energy and the voltage available to power the vehicle to be increased, while allowing the battery to remain operational in case of short-circuit of one of the accumulators, in particular as it allows the module corresponding to this defective accumulator to be deactivated and power to continue to be delivered with the other energy-storing modules, on condition that additional switching and control devices are provided.

During its use, the electrical battery may experience an electrical problem such as a short-circuit in an accumulator and/or a mechanical problem such as a shock impacting an accumulator. These problems may lead to thermal runaway in the electrical battery, in particular when it comprises lithium-ion accumulators. This thermal runaway may result in an increase in pressure in the accumulator and/or in the module, a release of gas, a release of smoke, the outbreak of a fire and/or spatter of material.

In this context, international regulations require motor-vehicle manufacturers to detect electrical-battery thermal runaway quite early on in order, on the one hand, to guarantee the safety of the occupants of the motor vehicle by allowing them to get out of the vehicle before the passenger compartment begins to fill with a release of smoke, and, on the other hand, to allow safety means of suitable design to electrically isolate the battery with a view to facilitating any emergency response.

Detection of thermal runaway is based, in most cases, on measurement of pressure within sealed modules. This pressure measurement in particular leads to delivery of thermal-runaway information when the measured pressure rises above a predetermined critical threshold. Such a technique is based on the variation in conditions within the storage module, and it has the disadvantage of being dependent on environmental conditions. By way of non-limiting examples, driving the motor vehicle at different altitudes may impact the pressure in the battery and/or within the energy-storing modules, and passage of this vehicle through a tunnel may modify the composition of the air likely to penetrate into the battery, and therefore modify gas-component distribution and the pressure measurements taken. It is therefore necessary to make the detection threshold high enough to avoid false alarms as regards thermal runaway. Therefore, the time required to reach this detection threshold is longer and therefore the time available to occupants to get out of the vehicle may be considerably decreased and their safety may be compromised.

Alternatively to the method described above, document U.S. Pat. No. 9,046,580 discloses a method for detecting a failure of an accumulator in a battery module on the basis of measurement of variations in the resistance of the electrical isolation of the module. This method may also include monitoring for secondary effects of the failure of the accumulator and/or of the module such as, for example, loss of continuity in the voltage chain, temperature of the module exceeding a threshold temperature, humidity exceeding a threshold humidity and/or temperature of the coolant associated with a system for cooling the module exceeding a threshold cooling temperature.

These methods therefore have the drawback of being required to evaluate, with a view to detecting failure of the accumulator and/or of the module, an increase in temperature and/or an increase in pressure and/or a change in humidity level, while allowing for environmental conditions. As was mentioned above, the time taken by occupants to reach safety may then be increased, this having the consequence of placing them in a dangerous situation.

BRIEF SUMMARY

The objective of the present invention is to mitigate at least one of the aforementioned drawbacks and to furthermore achieve other advantages by providing a new type of energy-storing module for an electrical vehicle, and in particular motor-vehicle, battery.

The present invention provides a module for storing electrical energy for a vehicle, in particular a motor vehicle, that comprises a plurality of electrical-energy accumulators each comprising at least one negative electrode composed at least partially of lithium-metal nitride, and said module for storing electrical energy further comprises at least one ammonia sensor for detecting a release of ammonia due to the decomposition of the lithium-metal nitride of the negative electrode in the presence of air or of moisture.

It must be understood here, and in all that follows, that the term “ammonia” designates a compound of chemical formula $NH_3$ that takes the form of a gas at room temperature.

The invention is based on detection of the presence of ammonia instead of a measurement of pressure, of temperature and/or of humidity level such as was described in the prior art. It should thus be noted that the invention advantageously differs from the prior art in that it is based on early detection of thermal runaway by detection of a gas not present in the storing module under the normal driving conditions of the vehicle, this gas appearing only under abnormal conditions due to a shock or wear resulting in the negative electrode of at least one accumulator making contact with air.

More particularly, the various layers of a lithium-ion electrical-energy accumulator are enclosed in an air-tight pouch and hence each of these layers, and in particular the negative electrode, can be exposed to air and/or to the moisture contained in the air only when a leak appears in the pouch. In case of such a leak, which may be due to wear of the accumulator or to a shock undergone by the vehicle, this exposure causes decomposition of the lithium-metal nitride and its transformation into ammonia. The ammonia sensor of the energy-storing module will then detect the presence of ammonia. Given that the ammonia sensor is specific to ammonia, it is therefore independent of the environmental conditions and the detection threshold may be very low. Detection of a malfunction may then be immediate, from as soon as one ammonia particle is detected, it not being necessary for the amount of ammonia present in the air to reach a critical threshold.

It is notable in this context that the decomposition of the lithium-metal nitride of the negative electrode is not necessarily synonymous with thermal runaway, the leak in the sealed pouch of the accumulator possibly being due to wear and not posing an immediate threat. It is however advantageous for the occupant of the vehicle to be made aware of this leak early on, before thermal runaway of the energy-storing module. This may allow the occupant time to safely visit a dealer with a view to having the energy-storing module, or even the electrical battery, changed. The safety of the occupant is therefore improved. Moreover, at high temperature, the ammonia formed by the decomposition of the lithium-metal nitride of the negative electrode, which is specific to the present invention, will generate the formation of dinitrogen gas in the presence of the oxygen contained in the air. This will then allow the amount of oxidant inside the electrical storing module to be decreased if/when a fire breaks out for example and therefore allow thermal runaway to be delayed in particular until the arrival of firefighters.

According to one embodiment, each electrical-energy accumulator comprises at least a positive electrode and a separator, in addition to a negative electrode.

According to one embodiment, the separator is arranged between the negative electrode and the positive electrode, thus forming a stack.

According to one embodiment, each electrical-energy accumulator comprises a jacket in which is placed the stack formed by at least the positive electrode, the separator and the negative electrode. It will be understood, with respect to what was described above, that the jacket forms a sealed enclosure in which the various electrodes are arranged and that it is breakage of the seal of this jacket that will cause the negative electrode to be exposed to free air and ammonia to be created.

According to one embodiment, the metal of the lithium-metal nitride is chosen from the group of the transition metals.

According to one embodiment, the metal of the lithium-metal nitride is chosen from the group comprising iron, manganese and an alloy thereof.

According to one embodiment, the lithium-metal nitride is delithiated. By "delithiated", what must be understood here, and in all that follows, is that the lithium-metal nitrite comprises vacancies in its structure that allow it to accommodate lithium ions in particular when the electrical-energy accumulator is recharged.

According to one embodiment, the lithium-metal nitride is at least partially composed of lithium-manganese nitride the formula of which is $Li_{7-x}MnN_4$ avec $x \leq 2.0$ and/or of lithium-iron nitride the formula of which is $Li_{3-x}FeN_2$, avec $x \leq 1.2$.

According to one embodiment, the energy-storing module comprises an ammonia sensor common to a plurality of electrical-energy accumulators. More particularly, the module for storing electrical energy comprises a casing forming a housing for the plurality of electrical-energy accumulators, the ammonia sensor being placed inside the casing. The ammonia sensor may be fastened to an internal face of one of the walls of the casing. When the sensor detects the presence of ammonia in the module, an exposure to free air of an accumulator is identified and the accumulators present in the module must be changed preventively for the safety of the occupant.

Alternatively, one ammonia sensor may be provided for each electrical-energy accumulator. It will be understood that, in this alternative, detection is more precise and that it is possible to identify in a targeted manner which accumulator is faulty and in particular which accumulator jacket is letting air through. This alternative embodiment however has a higher manufacturing cost and a compromise may be preferred whereby one ammonia sensor is made common to a plurality of accumulators, to decrease cost and nonetheless allow a remedial action to be taken, this action not requiring all the accumulators to be replaced but solely those in proximity to the sensor.

According to one embodiment, the ammonia sensor is chosen from a catalytic detector, a thermal-conductivity detector, a detector of infrared radiation, an electrochemical detector or a photoionization detector.

The present invention moreover relates to an electrical battery comprising a plurality of energy-storing modules and in which battery at least one module of the plurality of modules has at least one of the features described above.

The present invention also relates to a vehicle comprising at least one electrical battery according to one aspect of the invention.

The vehicle may be a motor vehicle, a two- or three-wheeled motorized electric road vehicle, an electric velocipede, or an electric scooter.

BRIEF DESCRIPTION OF THE DRAWINGS

Other features and advantages of the invention will become more apparent from the following description, on the one hand, and from a plurality of non-limiting exemplary embodiments that are given by way of indication with reference to the appended schematic drawings, on the other hand, in which drawings.

DETAILED DESCRIPTION

It will first be noted that although the figures illustrate the invention in a detailed manner with a view to implementation thereof, they may of course serve to better define the invention where appropriate. It will also be noted that, in all the figures, elements that are similar and/or that perform the same function have been designated by the same reference numbers.

The invention in particular relates to a module for storing electrical energy that is particular in that it comprises at least one accumulator the make up of which is specific, it having a negative electrode that is different from those conventionally employed, and in that it comprises, in this context, an ammonia sensor.

Figure 1:
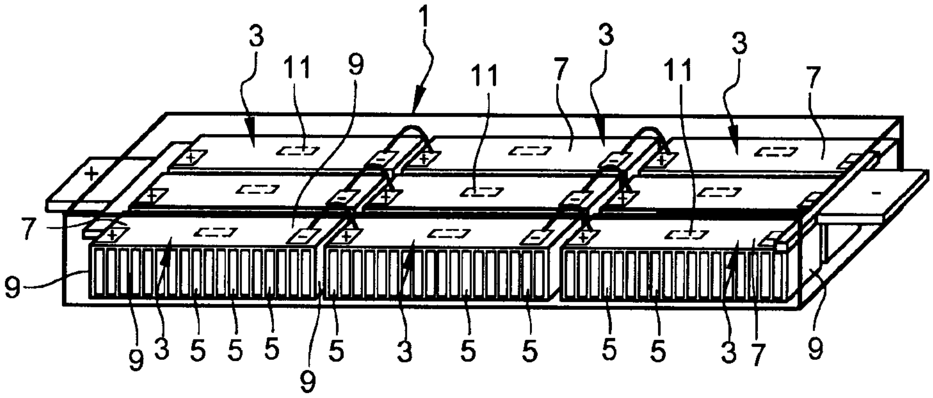
FIG. 1 is a schematic representation of a vehicle electrical battery comprising a plurality of energy-storing modules according to the invention.

With reference to FIG. 1, a plurality of these modules 3 for storing electrical energy have been illustrated, each comprising a plurality of electrical-energy accumulators 5. Such modules 3 for storing electrical energy may form an electrical battery 1 but also a capacitor or a supercapacitor. The electrical battery may be used in any vehicle, for example a motor vehicle, a two- or three-wheeled motorized electric road vehicle, an electric velocipede, or an electric scooter.

The module 3 for storing electrical energy comprises a casing 7 the walls 9 of which form a housing for a plurality of electrical-energy accumulators 5 and at least one ammonia sensor 11. In the illustrated example, the casing 7 here has a parallelepipedal shape with six walls, among which it is possible to differentiate between, such as is more particularly visible in FIG. 2, a bottom wall 90, sidewalls 92 and a closing cover 94.

The electrical-energy accumulators 5 are placed against the bottom wall 90, where appropriate in a matrix 96 that allows the accumulators to be positioned with respect to one another and with respect to the walls of the casing 7.

Figure 2:
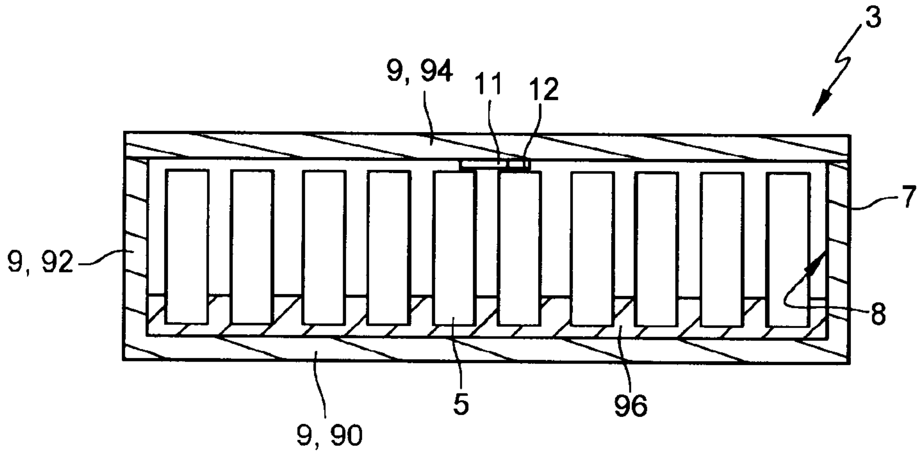
FIG. 2 is a schematic representation of an energy-storing module according to one aspect of the invention.

The ammonia sensor 11 is arranged inside the casing, i.e., such as illustrated in FIG. 2, in the housing formed by the walls 9 of the casing 7 of the module 3 for storing electrical energy. Thus, one ammonia sensor 11 is common to a plurality of accumulators 5.

The ammonia sensor 11 comprises, or is associated with, communication means 12 that are configured to transmit ammonia-detection information to a control module able to transmit a warning signal to the occupant and/or to transmit an instruction to cut the supply of power of the electrical battery or at least of the corresponding energy-storing module. In the illustrated example, the communication means consist of wireless communication means though it will be understood that the invention is not limited thereto.

In the example illustrated in FIG. 2, the ammonia sensor 11 is arranged on an internal face 8 of one of the walls 9 of the casing 7, and more particularly here on the internal face of the closing cover 94. It should be noted that the invention is not limited to this position of the ammonia sensor on the closing cover. However, it is advantageous for, on the one hand, the ammonia sensor 11 not to make mechanical contact with the electrical-energy accumulators 5, and for, on the other hand, the ammonia sensor 11 to be placed in a central position so that the distance between this ammonia sensor and the accumulator 5 from which the sensor is furthest is a small as possible.

The ammonia sensor 11 may be a catalytic detector, a thermal-conductivity detector, a detector of infrared radiation, an electrochemical detector or a photoionization detector.

The catalytic detector is based on measurement of the heat of combustion of ammonia molecules on the surface of a metal catalyst.

The thermal-conductivity detector is configured to measure the variation in thermal conductivity of the atmosphere caused by the presence of ammonia.

The detector of infrared radiation is based on the absorption of infrared radiation by the ammonia molecules.

The electrochemical detector is based on a redox reaction at room temperature. The ammonia molecules absorb on the surface of a catalyst and react with the ions of a solution causing an electrical current to flow.

The photoionization detector is an ion detector using energetic photons in the ultraviolet range to ionize the molecules of ammonia gas. The ammonia gas is bombarded with photons, this allowing electrons to be torn from the gas molecules, thus converting them into cations. The gas molecules are therefore ionized, this allowing an electrical current to flow. Detection of an electrical current may thus be considered equivalent to the presence of ammonia. This type of detector is non-destructive, because it does not modify the molecules of ammonia gas that it detects.

The choice of such or such a type of ammonia sensor may particular be made depending on the bulk of the aforementioned detectors and on the space available in the casing of the energy-storing module.

According to the invention, the presence of the ammonia sensor 11 in the energy-storing module is combined with the feature according to which at least one accumulator comprises a specific electrode.

Figure 3:
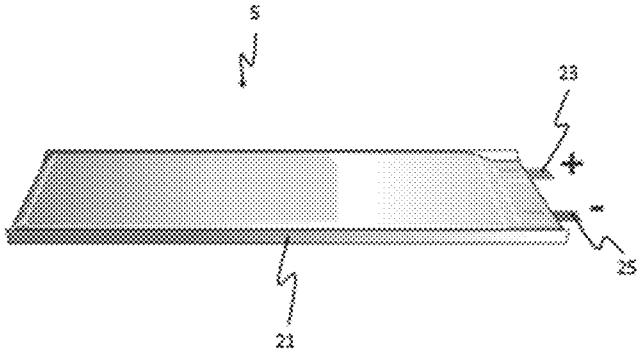
FIG. 3 is a schematic representation of an electrical-energy accumulator with which the energy-storing module of FIG. 2 is able to be equipped.
Figure 4:
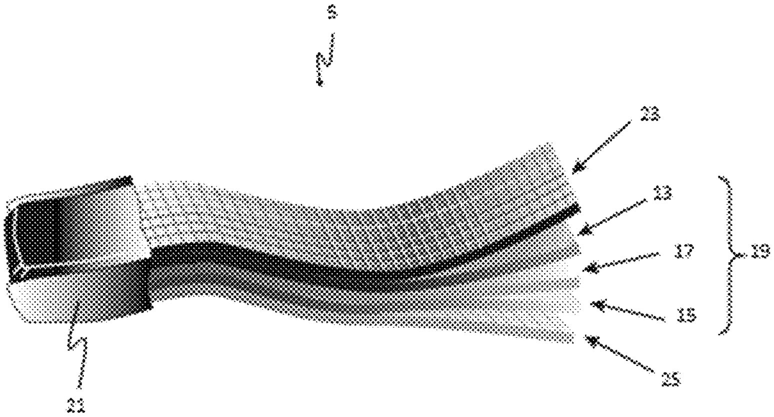
FIG. 4 is a partial schematic representation of the electrical-energy accumulator of FIG. 3, a cross section allowing components of the accumulator that are housed inside the jacket shown in FIG. 3 to be seen.

With reference to FIGS. 3 and 4, each electrical-energy accumulator 5 comprises at least one positive electrode 13, at least one negative electrode 15 and at least one separator 17. The electrical-energy accumulators 5 are, each, assembled by stacking the positive electrode 13, the negative electrode 15 and the separator 17, the latter being placed between the two electrodes 13, 15. The separator 17 may be impregnated with a solution containing at least one electrolyte.

This stack forms an electrochemical core 19 that is then placed in a jacket 21 so that a positive terminal 23 and a negative terminal 25 of the electrical-energy accumulator 5, which may be seen in FIG. 3, are accessible from the exterior of the jacket 21 and may be connected to an electrical feed network within the electrical battery of the vehicle.

The jacket 21 forms a sealed enclosure that protects the electrochemical core 19 from air. In the example illustrated in the figures, the jacket consists of a substantially planar pouch and the stack of the electrodes and of the separator within this jacket consists of a superposition of substantially planar layers. It should be noted that the invention is not limited thereto, and that other accumulator embodiments could be implemented here, with for example a cylindrical jacket inside of which the stack of the electrodes and of the separator also has a roll shape in order to be housed in the jacket.

The positive electrode 13 forms the cathode when the electrical-energy accumulator 5 is discharging and therefore when the electrical battery 1 is discharging. The positive electrode 13 may be composed of at least one active material, optionally of at least one agent of electronic conduction, and optionally of a least one binder.

The active material of the positive electrode 13 is delithiated, i.e. lithium ions may in particular be reversibly inserted therein at a potential higher than the operating potential of the negative electrode 15.

The content of active material in the positive electrode 13 may be from 5 to 98% by weight, the content of agent of electronic conduction may be from 0.1 to 30% by weight, and the content of binder may be from 0 to 25% by weight, with respect to the total weight of the positive electrode 13.

The active material of the positive electrode 13 may be composed of a certain number of oxides. By way of example, the active material of the positive electrode 13 may be:

manganese dioxide ($MnO_2$); iron oxide; copper oxide; nickel oxide; composite lithium-manganese oxides (e.g. $Li_xMn_2O_4$ or $Li_xMnO_2$); composite lithium-nickel oxides (e.g. $Li_xNiO_2$); composite lithium-cobalt oxides (e.g. $Li_xCoO_2$); composite lithium-nickel-cobalt oxides (e.g. $LiNi_{1-y}Co_yO_2$); composite lithium-nickel-cobalt-manganese oxides (e.g. $LiNi_xMn_yCo_zO_2$, with x+y+z=1); composite lithium-enriched lithium-nickel-cobalt-manganese oxides (e.g. $Li_{1+x}(NiMnCo)_{1-x}O_2$); composite oxides of lithium and of a transition metal; composite lithium-manganese-nickel oxides of spinel structure (e.g. $Li_xMn_{2-y}Ni_yO_4$); lithium-phosphorus oxides of olivine structure (e.g. $Li_xFePO_4$, $Li_xFe_{1-y}Mn_yPO_4$ or $Li_xCoPO_4$); iron sulfate ($Fe_2(SO_4)_3$); and vanadium oxides (e.g. $V_2O_5$).

The agent of electronic conduction may be a carbon-containing material, for example carbon black, acetylene black, natural or synthetic graphite, carbon nanotubes, or one of the mixtures thereof.

The binder may be a polymer for example chosen from copolymers of ethylene and propylene optionally containing a repeat unit allowing cross-linkage; styrene-butadiene copolymers, such as for example styrene-butadiene rubbers (SBR); acrylonitrile-butadiene copolymers (ABR); poly(tetrafluoroethylenes), such as for example polytetrafluoroethylene (PTFE) or polyvinylidene difluoride (PVDF); cellulose derivatives, such as for example, carboxymethyl cellulose (CMC) or hydroxyethyl cellulose (HEC).

The negative electrode 15 comprises at least one active material, optionally an agent of electronic conduction, and optionally a binder. The active material of the negative electrode 15 is delithiated, i.e. lithium ions may in particular be reversibly inserted therein at a potential lower than the operating potential of the positive electrode 13.

According to the invention, the active material of the negative electrode 15 is composed of a lithium-metal nitride. It is this particular configuration of an electrode of an accumulator that, combined with the presence of an ammonia sensor 11 such as mentioned above, i.e. present in the energy-storing module and/or the battery in which said accumulator is positioned, that allows early detection of potential malfunction of an energy-storing module.

The active material of the negative electrode 15 may be such that the metal of the lithium-metal nitride is chosen from the group of the transition metals.

More specifically, the inventors have been able to observe that the active material of the negative electrode 15 may be composed at least partially of lithium-manganese the formula of which is $Li_{7-x}MnN_4$ avec $x \leq 2.0$ and/or of lithium-iron nitride the formula of which is $Li_{3-x}FeN_2$, avec $x \leq 1.2$. The electrochemical potential of lithium-manganese nitride with respect to lithium is 1.18 V, and the electrochemical potential of lithium-iron nitride is 1.24 V, for high specific capacities (300 mAh/g and 200 mAh/g, respectively) available at a potential lower (−0.25 V) than the working potential (1.5 V) of lithium-titanium oxide (LTO: $Li_4Ti_5O_{12}$). Lithium-titanium oxide, with a specific capacity limited to 150 mAh/g, is the highest performance negative-electrode material currently available for lithium-ion power batteries. Lithium-manganese nitride and lithium-iron nitride therefore have a higher energy density. Lithium-manganese nitride and lithium-iron nitride also have a good resistance to application of high current densities, this being particularly advantageous for the accumulators of hybrid vehicles.

The agent of electronic conduction and the binder may respectively be those described above with regard to the positive electrode 13 of the electrical-energy accumulator 5.

The content of active material in the negative electrode 15 may be from at least 60% by weight, the content of agent of electronic conduction may be from 0 to 30% by weight, and the content of binder may be from 0 to 30% by weight, with respect to the total weight of the negative electrode 15.

The separator 17, which is located between the electrodes of an electrical-energy accumulator 5, plays the role of electrical insulator. The separator 17 is generally composed of porous polymers, and in particular made of a polyolefin, and preferably of polyethylene and/or polypropylene. It may also be made of glass microfibers. The separator 17 may be a glass-microfiber separator (CAT No. 1823-070®) sold by Whatman.

The separator is generally imbibed with at least one solution of electrolytes. The electrolytes used comprise at least one lithium salt and at least one solvent.

The lithium salt may be an inorganic salt such as for example lithium hexafluorophosphate ($LiPF_6$). The lithium salt may also be an organic salt such as for example lithium bis[(trifluoromethyl)sulfonyl]imide ($LiN(CF_3SO_2)_2$), lithium trifluoromethane sulfonate ($LiCF_3SO_3$), lithium bis(oxalato)borate (LiBOB) or even lithium fluoro(oxalato)borate (LiFOB).

The lithium salt is, preferably, dissolved in at least one solvent chosen from polar aprotic solvents, for example, ethylene carbonate (EC), propylene carbonate (PC), dimethyl carbonate (DMC), diethyl carbonate (DEC) and ethyl methyl carbonate (EMC).

Following a shock leading to a deformation of one or more accumulators 5 or indeed following accelerated wear of one of these accumulators, at least one jacket 21 protecting an electrochemical core 19 of an electrical-energy accumulator 5 may be damaged and therefore let air pass. The negative electrode 15 is then exposed to air and/or to moisture contained in the air. This exposure causes decomposition of the lithium-metal nitride of the negative electrode 15 and this results in a release of ammonia results.

The ammonia sensor 11 present in the module 3 for storing electrical energy is then able to detect the ammonia molecules released by the decomposition of the lithium-metal nitride. Given that the ammonia sensor 11 is specific to ammonia, it is therefore independent of the environmental conditions and the detection threshold may be very low, and hence a warning of malfunction may be sent as soon as ammonia appears in the air.

Such as mentioned above, the release of ammonia that occurs according to the invention during a malfunction, and more particularly a loss of the seal of a jacket of an accumulator 5, tends subsequently to cause dinitrogen gas to form in the presence of air and at high temperature. This has the effect of decreasing the amount of oxidant available inside the module 3 for storing electrical energy and may therefore retard thermal runaway of the module 3 for storing electrical energy and therefore of the electrical battery 1.

Of course, the invention is not limited to the examples that have just been described and many modifications may be made to these examples without departing from the scope of the invention.

The invention claimed is:

1. A module for storing electrical energy for a vehicle comprising:

at least one electrical-energy accumulator comprising at least one negative electrode composed at least partially of lithium-metal nitride; and at least one ammonia sensor for detecting a release of ammonia due to decomposition of the lithium-metal nitride of the negative electrode in the presence of air or of moisture, the ammonia sensor being configured to transmit a warning only in response to detecting the release of ammonia.

2. The module for storing electrical energy as claimed in claim 1, wherein a metal of the lithium-metal nitride is chosen from a group of transition metals.

3. The module for storing electrical energy as claimed in claim 1, wherein a metal of the lithium-metal nitride is chosen from a group comprising iron, manganese and an alloy thereof.

4. The module for storing electrical energy as claimed in claim 1, wherein the lithium-metal nitride is delithiated.

5. The module for storing electrical energy as claimed in claim 1, wherein the lithium-metal nitride is at least partially composed of lithium-manganese nitride the formula of which is "$Li_{7-x}MnN_4$, with $x \leq 2.0$" and/or of lithium-iron nitride the formula of which is "$Li_{3-x}FeN_2$, with $x \leq 1.2$".

6. The module for storing electrical energy as claimed in claim 1, further comprising a casing that forms a housing for the electrical-energy accumulators, the ammonia sensor being placed on a wall of the casing.

7. The module for storing electrical energy as claimed in claim 6, wherein the ammonia sensor is placed on an internal face of the wall of the casing.

8. The module for storing electrical energy as claimed in claim 1, wherein the ammonia sensor is chosen from a catalytic detector, a thermal-conductivity detector, a detector of infrared radiation, an electrochemical detector, and a photoionization detector.

9. A vehicle electrical battery comprising:

a plurality of energy-storing modules, wherein at least one module for storing electrical energy of the plurality of energy-storing modules is the module for storing electrical energy as claimed in claim 1.

10. A vehicle comprising:

the electrical battery as claimed in claim 9.

11. The module for storing electrical energy as claimed in claim 1, wherein the ammonia sensor is configured to only detect the release of ammonia.

* * * * *